United States Patent
Tada et al.

(10) Patent No.: US 6,928,564 B2
(45) Date of Patent: Aug. 9, 2005

(54) METHOD FOR MANAGING IMAGE PROCESSING DEVICES ON A NETWORK

(75) Inventors: Kaoru Tada, Aichi-Ken (JP); Jiro Goto, Aichi-Ken (JP); Tatsuji Hirakawa, Aichi-Ken (JP); Katsuhisa Toyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 598 days.

(21) Appl. No.: 10/104,018

(22) Filed: Mar. 25, 2002

(65) Prior Publication Data

US 2002/0144162 A1 Oct. 3, 2002

(30) Foreign Application Priority Data

Mar. 30, 2001 (JP) ....................... 2001-102652

(51) Int. Cl.[7] .............. G06F 1/28; G06F 1/32; H04N 1/00
(52) U.S. Cl. .................. 713/321; 713/340; 358/1.15
(58) Field of Search ................. 713/300, 320, 713/321, 323, 340; 358/1.1, 1.13, 1.14, 1.15; 709/201, 202, 203

(56) References Cited

U.S. PATENT DOCUMENTS 5,842,027 A * 11/1998 Oprescu et al. ............ 713/300
6,029,238 A    2/2000 Furukawa
6,243,821 B1 * 6/2001 Reneris ..................... 713/323
6,724,493 B1 * 4/2004 Maruta et al. ............. 358/1.14
6,735,456 B2 * 5/2004 Cathey et al. .............. 455/574

FOREIGN PATENT DOCUMENTS

| JP | H8-331292 | 12/1996 |
| JP | H9-16027 | 1/1997 |
| JP | H9-91103 | 4/1997 |
| JP | H10-224530 | 8/1998 |

* cited by examiner

Primary Examiner—Thuan Du
(74) Attorney, Agent, or Firm—Burns, Doane, Swecker & Mathis, L.L.P.

(57) ABSTRACT

In a client personal computer, when a user starts a remote copy program, the initial remote copy and setting screens are displayed on a screen. Together with this display, power consumption information and status information describing the operating state of each image processing device such as printers and scanners are collected over a network. This information is updated as necessary. The power consumption is estimated for each combination of image processing devices cooperatively processing a job based on the collected information. The combination having the least power consumption among the possible combinations is displayed on a screen. When a user presses the start key, operation specification information including specification for cooperatively executing a job are transmitted to each selected image processing device. In this way, the combination having the least power consumption is selected when a plurality of image processing devices connected on a network cooperatively process a job.

16 Claims, 9 Drawing Sheets

COMPREHENSIVE POWER CONSUMPTION ESTIMATE TABLE

METHOD FOR MANAGING IMAGE PROCESSING DEVICES ON A NETWORK

The present application claims priority to Japanese Patent Application No. 2001-102652 filed Mar. 30, 2001, the entire content of which is hereby incorporated by reference.

BACKGROUND OF THE INVENTION

1. Field of the Invention

The present invention relates to a management device for image processing devices connected on a network, an image processing device, management method, programs and recording media.

2. Description of the Related Art

Interest in environmental issues has increased in recent years, and many enterprises are struggling to obtain certification for the environment management system standard (e.g., ISO14000). Obtaining certification for this standard requires reducing the power consumption of all image processing devices such as copiers, printers, scanners and the like connected to a network, and various proposals have been made to this end.

For example, U.S. Pat. No. 6,029,239 discloses art for acquiring the rated power consumption of a plurality of image forming apparatuses connected on a network, and issuing jobs to the image forming apparatus having the lowest running cost based on the acquired ratings.

Conventionally, only a single image forming apparatus is selected based on the rated power consumption, e.g., when a job is processed using a plurality of image processing devices such as when copying on a network using scanners and printers connected to the network, the processing of the job cannot be applied to all devices.

SUMMARY OF THE INVENTION

A main object of the present invention is to provide a management method capable of determining a combination of least power consumption when processing a job using a plurality of image processing devices connected on a network.

These and other objects are attained by one aspect of the present invention providing a management device connected to a plurality of image processing devices over a network, wherein the management device is provided with a power consumption acquiring means for acquiring comprehensive power consumption information for each combination of image processing devices cooperatively processing a job among the plurality of image processing devices; selection means for selecting one combination or a plurality of combinations having the least comprehensive power consumption among the combinations of the image processing devices; and display means for displaying the selected one combination or plurality of combinations.

Another aspect of the present invention provides a management device connected to a plurality of image processing devices over a network, wherein the management device is provided with a power consumption acquiring means for acquiring comprehensive power consumption information for each combination of image processing devices cooperatively processing a job among the plurality of image processing devices; selection means for selecting a combination having the least comprehensive power consumption among the combinations of the image processing devices; and job request destination setting means for setting a combination of selected image processing devices as the job request destination.

When an information acquiring means is provided for acquiring information of the operating state of each image processing device and the power consumption information inherent to each device, the power consumption acquiring means can determine the comprehensive power consumption based on the information of the operating state of each image processing device and the inherent power consumption information.

When a candidate selection means is provided for selecting a candidate combination of image processing devices for cooperatively processing a job, the power consumption acquiring means can acquire comprehensive power consumption information of the candidate combination.

When a receiving means is provided for receiving job processing condition input, the power consumption acquiring means can acquire comprehensive power consumption information when a job is processed in accordance with the received job processing conditions.

Yet another aspect of the present invention provides the above-described management device in an image processing device connected to other image processing devices over a network, and which is capable of executing a job cooperatively with one other or a plurality of other image processing devices. The local image processing device may itself be included in the combination of image processing devices selected by the selection means of the management device.

In the above description, "job" includes each type of job such as an image reading job and the like in addition to a print job. Furthermore, "job processing conditions" is a concept including modes such as duplex printing, one-sided printing, color printing, monochrome printing, recording sheet size and number of sheets to be printed and the like, in addition to processing modes such as interrupting another print job to execute the current job and the like.

In the above-description, "power consumption" is a concept including not only so-called power consumption, but also the amount of power consumption.

The invention itself, together with further objects and attendant advantages will be best understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

The embodiments of the management device and the like of the present invention are described hereinafter with reference to the accompanying drawings.

(1) Structure of a Network Including a Management Device

Figure 1:
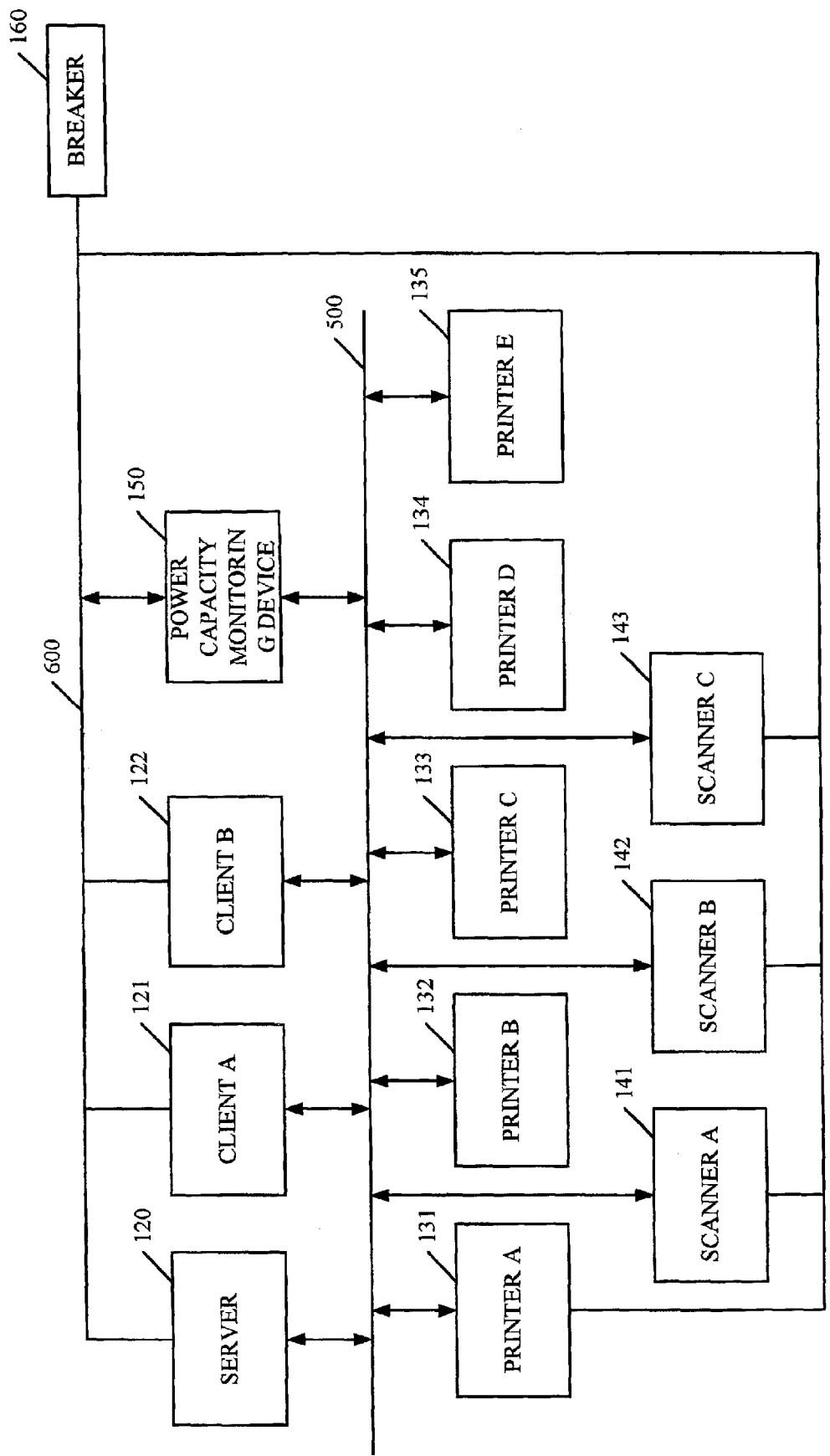
FIG. 1 shows the general structure of a network system including the management device of the present invention.

The structure of a network system including the management device of the embodiments is described below. FIG. 1 shows an example of the structure of such a network system. The network system in the drawing comprises a server 120, client A121, client B122, printer A131~printer E135, scanner A141~scanner C143, and power capacity monitoring device 150 respectively connected to a network 500. In the present embodiment, an Ethernet LAN (local area network) is used as the network 500, and communication among devices occurs in accordance with TCP/IP protocols and the like.

Each device connected to the network 500 is connected through a plug and plug socket not shown in the drawing to a power line 600 for receiving power from an external source through a breaker 160, and the power capacity monitoring device 150 monitors the power consumption of these devices, and regulates the power supply to specific devices in accordance with requirements so as not allow the power consumption of the entire network to exceed a power upper limit permitted to the network system.

The server 120 has a so-called print server function, and receives print job input from the client A121 and client B122, and transmits the print job to any printer among the printers A131~printer E135. The client A121 and client B122 are provided with display units comprising a display device or the like, and the management device of the present invention can be applied, for example, to the client A121 and client B122.

Although the management device of the present invention is applied to the client A121 in the following examples, the management device also may be applied to the client B122.

(2) Printer Controller

In the present embodiment, laser printers capable of duplex printing in full color are used as the printer A131~printer E135. Furthermore, the so-called [N-in-1] function for displaying the reduced images of N pages (N=2, 4, 6 . . . ) on a single page and the like are provided for copy modes of each printer. The structure of these printers is well known and explanation of the structure is therefore omitted.

Figure 2:
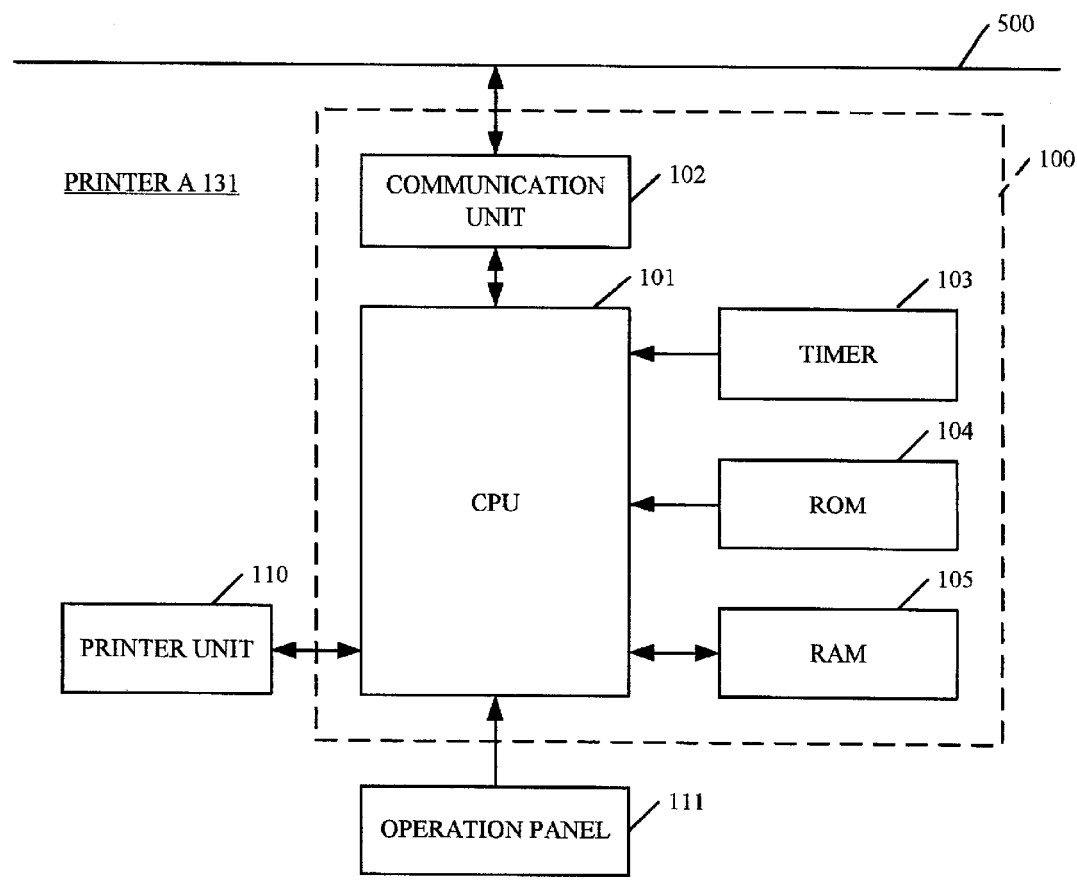
FIG. 2 is a block diagram showing the structure of the control unit within a printer connected to the network.

FIG. 2 is a block diagram showing the structure of the control unit 100 built in each printer 131. The control unit 100 shown in the drawing is provided with a CPU 101, communication unit 102, timer 103, ROM 104, and RAM 105 and the like.

The communication unit 102 controls transmission and reception of information with the server 120 and client A121 and client B122 over the network 500. An operation panel 111 displays various types of keys and specific operation screens on a touch display, and receives operation input from the various keys and touch display. A timer 103 is connected to the operation panel 111 and counts the time during which there is no input to conserve power supplied to the printer unit. This power conservation is controllably enforced when there has been no operation on the operation panel 111 and a specific time has elapsed in the timer 103, whereupon the printer is moved from a [ready] state capable of immediately forming an image to a [standby] state wherein the temperature of the heater of the fixing device is reduced, and when a further time has elapsed, the printer is moved to a [sleep] state wherein power is cut to all but the control unit 100. Hereinafter, [status information] includes information relating to these power conservation states and information when an error such as a paper jam and paper out condition is generated.

The ROM 104 stores programs for controlling the printer unit 110 for image formation, programs for controlling power conservation, programs for controlling communications and the like, and further stores data (power consumption information) such as rated power consumption for normal operation of the printer A131, and power consumption for returning from the sleep state and standby state to the ready state.

The RAM 105 stores flags and variables required for the aforesaid controls, or acts as primary storage for a print mode set from the operation panel 111. In particular, flags corresponding to the current status of the printer are stored in RAM 105. When an inquiry is received from the client A121 or client B122, the control unit 100 is programmed to respond to the sending origin device with status information and power consumption information.

When the operation of the operation panel 111 or a remote job is received, the CPU 101 reads the required program from the ROM 104 to control the printer 110 to execute a smooth image formation operation, and controls power usage to conserve energy.

Although not specifically shown in the drawing, each scanner is provided with a communication unit, ROM, RAM, and operation panel (display unit) with a CPU at the center, and are constructed so as to be controllable not only in the sleep state and standby state, but also to respond to an inquiry from the management device with status information and power consumption information as previously mentioned.

Any printer, e.g., printer A131, may be used as the printer unit of the digital copier. In this case, if image data obtained by the image reader unit of the copier reading a document are transmitted to the server 120 or the like over the network 500, this image reader unit may function as, for example, a scanner A141 in FIG. 1.

The other printers B132~E135 have identical structures.

(3) Structure of Client A121

The client A121 is described below as an example of the management device of the present invention.

Figure 3:
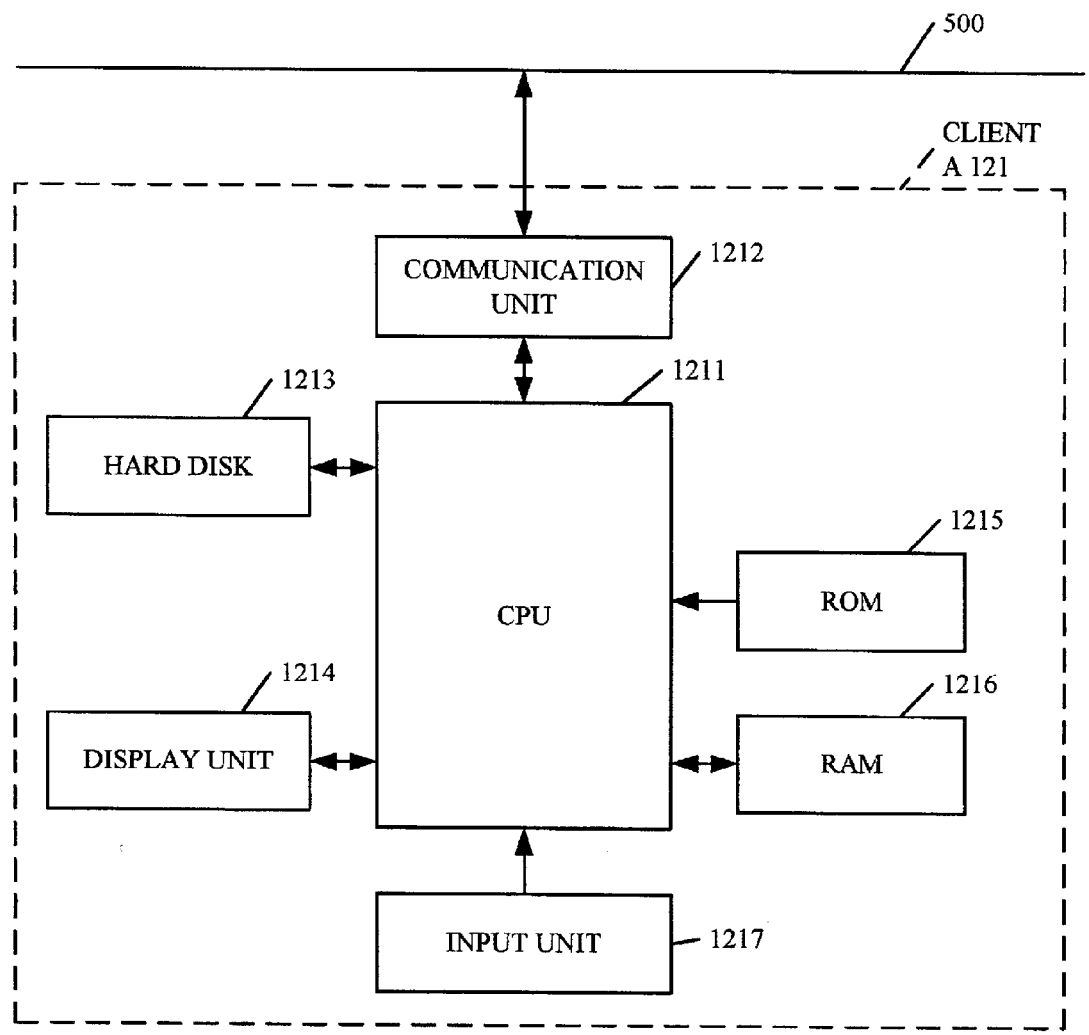
FIG. 3 is a block diagram showing the structure of the management device (client computer) connected to the network.

FIG. 3 is a function block diagram showing the structure of the client A121. As shown in the drawing, the client A121 comprises a CPU 1211, communication unit 1212, hard disk 1213, display unit 1214, ROM 1215, RAM 1216, and input unit 1217.

The communication unit 1212 controls transmission and reception of information among printer A131~printer E135, scanner A141~scanner C143 (hereinafter referred to generically as "image processing devices"), other servers 120, and client B122 over the network 500.

The hard disk 1213 stores the network operating system (OS), printer drivers, application software for generating documents and the like, as well as programs for selecting combinations of least power consumption for cooperatively executing remote copies from image processing devices over the network, and comprehensive power consumption estimation table. The comprehensive power consumption estimation table is a table showing the power consumption for each combination of scanner and printer, and is generated by the CPU 1211 based on the status information and power consumption information collected from the image processing devices on the network. The ROM 1215 stores the basic system program of the client A121. The RAM 1216 stores variables and flags required for the previously described controls. A keyboard, mouse and the like may be used as the input unit 1217 for user input.

(4) Remote Copy Job Setting Operation

Figure 4:
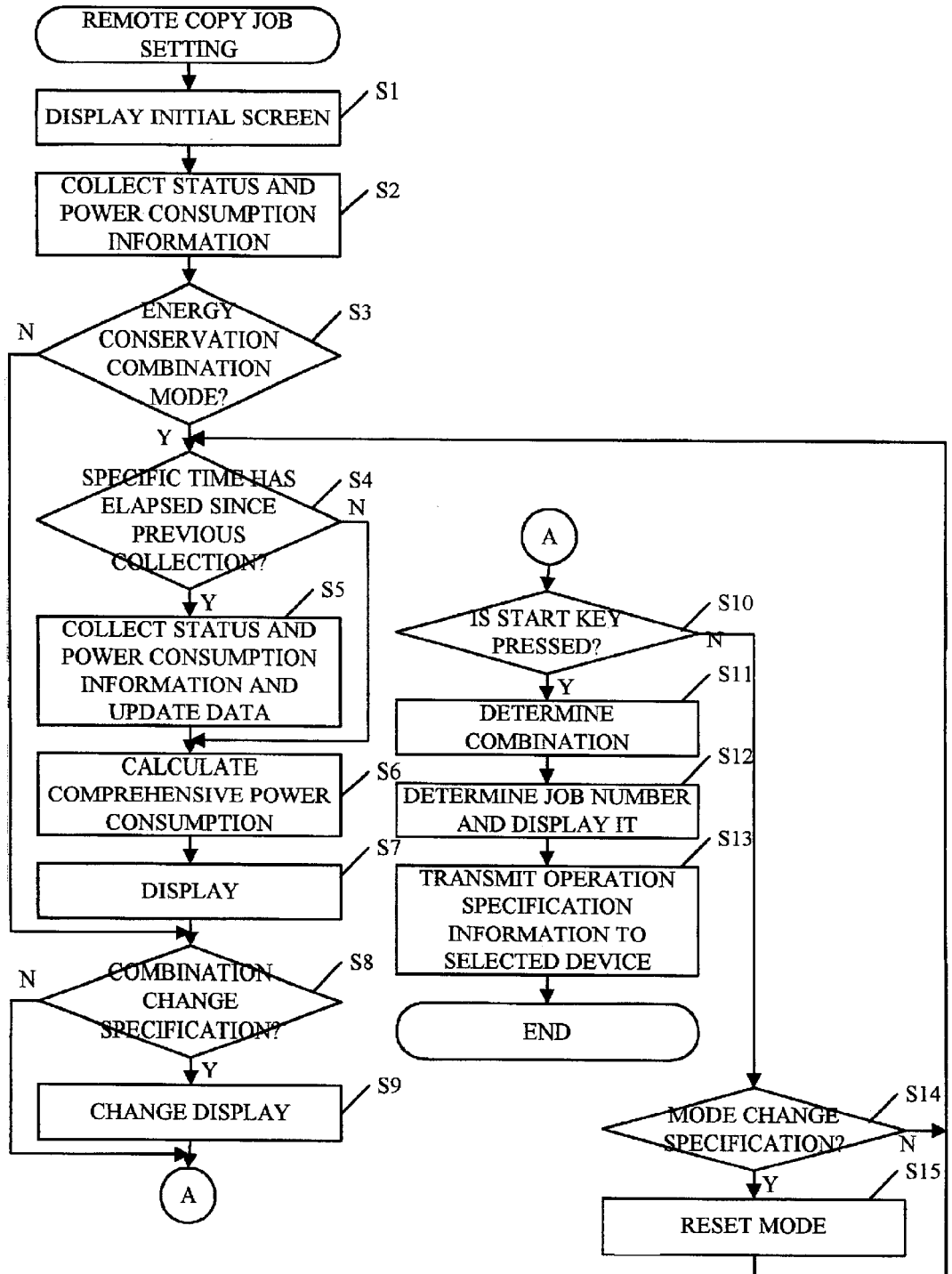
FIG. 4 is a flow chart showing the content of the remote copy job setting process executed by the management device.

The remote copy job setting operation by the client A121 is described below based on the flow chart of FIG. 4. A remote copy job is a job wherein an input image from a scanner is transmitted over the network to a printer and the image is printed by the printer.

This control operation is realized by starting a program installed on the client A121. In the following description of the operation, when any image processing device (printer and scanner) is specified, the reference symbols shown in FIG. 1 are not particularly used.

Figure 7:
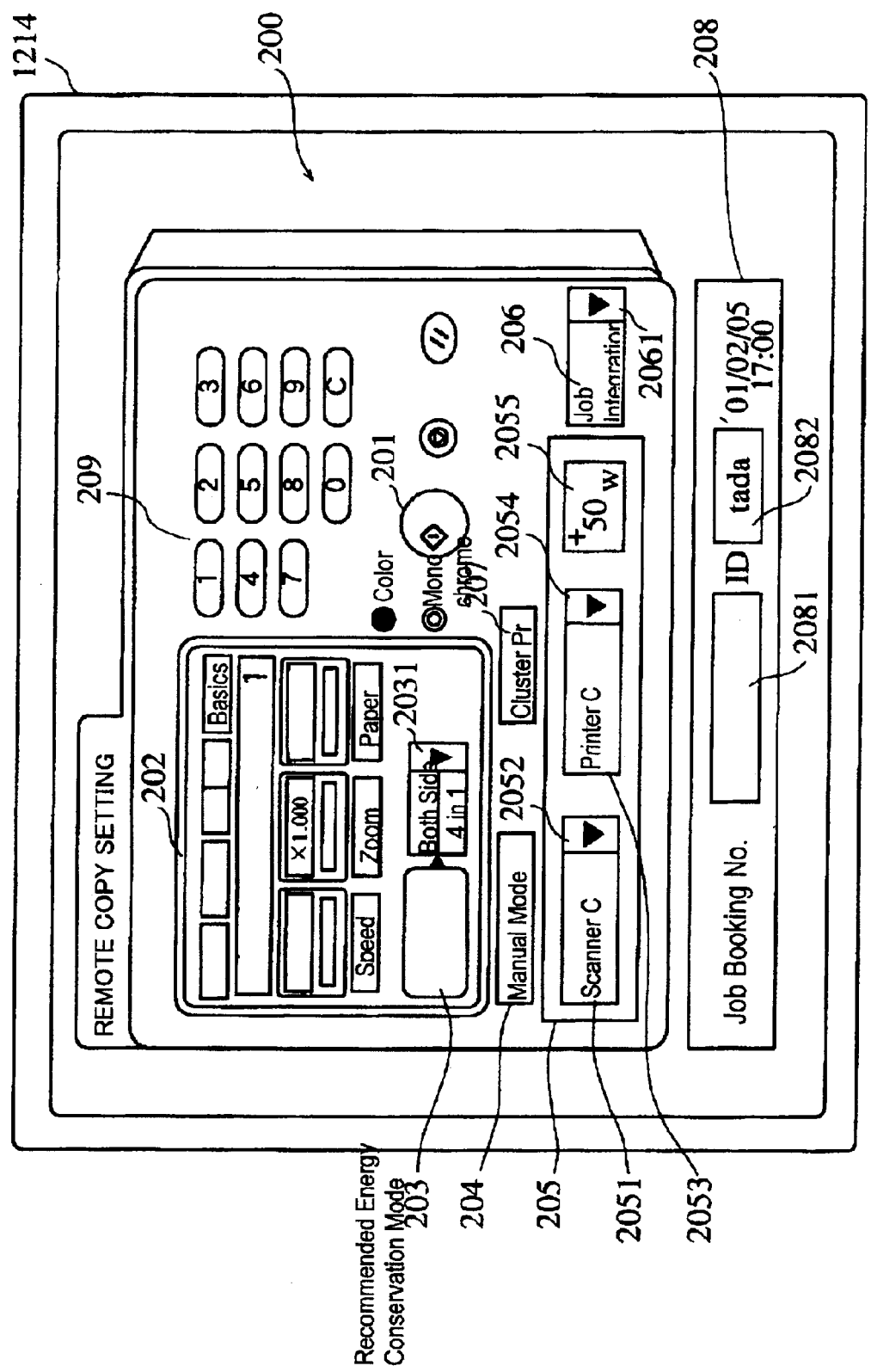
FIG. 7 is the initial screen displayed on the display unit of the management device when a remote copy job program is started.

When a user specifies a program start, first, the initial screen for the remote copy setting is displayed on the display unit 1214 as shown in FIG. 7 (step S1).

The top half of the display content of the remote copy job setting screen 2000 virtually displays an operation panel of a general copier, and comprises a start key 201, mode setting unit 202 for setting various copy modes, ten-key pad for setting the number of copies and the like, as well as recommended energy conservation mode display 203 for displaying a copy mode recommended for energy conservation, manual mode key 204 for allowing a user to set a scanner and printer combination, energy conservation combination display 205 for displaying the combination of devices of least power consumption, processing mode setting unit 206 for specifying a job processing mode, cluster print specification key 207 for allocating a print job to a plurality of printers for printing, and specification information display 208 for displaying job booking number and device ID number (hereinafter referred to as "operation specification information") transmitted to the selected combination of devices.

The buttons 2031, 2052, 2054, 2061 shown in FIG. 7 are buttons for displaying other candidates in the display content, and when these buttons are selected, a window opens and a plurality of other candidates are displayed in a vertical column, and the setting content can be changed by selecting any of these candidates.

In step S2, status information and power consumption information are collected from each image processing device over the network 500 and stored in the internal RAM 1216 (step S2).

Next, a determination is made as to whether or not an energy conservation combination mode is set (step S3). In the present embodiment, remote copy execution by the energy conservation combination mode is the rule; the elapse of a specific time t1 is awaited and when the manual mode key 204 has not been pressed, the routine advances to step S4 to execute the energy conservation combination mode. Then, a determination is made as to whether or not a specific time t2 has elapsed since the collection of status information and power consumption information collected of the previous cycle, and if time t2 has elapsed, the status information and power consumption information of each image processing device is again collected over the network 500 since there is a possibility that the status of the image processing devices may have changed, and the data within RAM 1216 is updated. It is desirable that the value of time t2 sufficiently large to not overload the network 500. For example, approximately 1 minute.

The CPU 1211 calculates an estimate of power consumption required to execute a job quantity (e.g., 20 A-4 size copies) set temporarily at the initial setting in the currently set copy mode for each combination of scanner and printer capable of cooperative copy jobs based on the status information and power consumption information of each image processing device stored in RAM 1216 (step S6), and generates and stores a comprehensive power consumption estimation table on the hard disk 1213.

Generation of the comprehensive power consumption estimation table for the provisional job quantity is a relative evaluation based on whichever combination of image processing devices has the best energy conservation, and is further based on the concept that a user counting the pages of the document beforehand is laborious. However, since it is obviously desirable to obtain an estimate value of power consumption based on an accurate job quantity, the number of document pages actually may be input beforehand to generate the comprehensive power consumption estimation table for this copy job.

In the present embodiment, the comprehensive power consumption estimation table is generated for each process model as described below.

A. Job Integration Model (A process mode for integrating with a currently executing copy job, and executing a specified job directly after the executing job ends.)

B. Job Interrupt Model (A process mode for executing a specified job during the interval of a currently executing copy job.)

C. Recommendation Model (Obvious copy mode combination based on energy conservation efficiency.)

In the present embodiment, a combination of duplex copy and 4-in-1 is initially set as the [recommendation model (1)], and a combination of duplex copy and 2-in-1 is initially set as the [recommendation model (2)].

Generation examples of comprehensive power consumption estimation tables when executing the job integration model A among the aforesaid process models is described below based on FIG. 8.

The comprehensive power consumption estimation table shown in the drawing shows the scanner type listed horizontally and the printer type listed vertically, and the bottom half shows printer combinations for cluster printing. Status information of each image processing device is stored in the columns and lines inside the table.

Figure 9A:
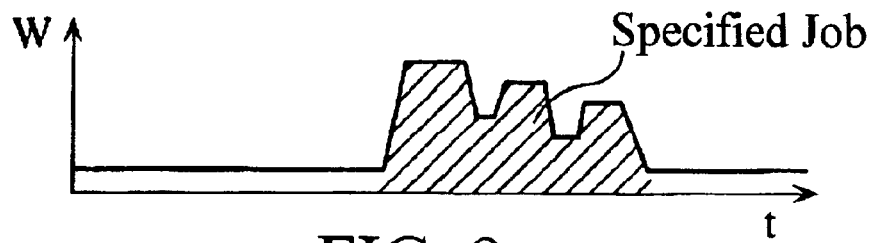
FIGS. 9a~9d show models of power consumption for each pattern of job processing modes.
Figure 9B:
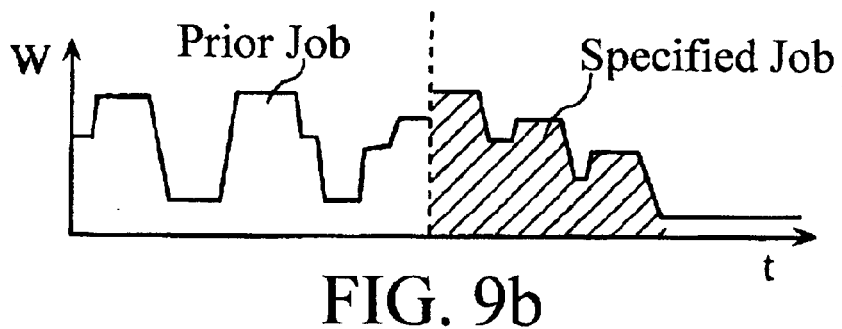
Figure 9C:
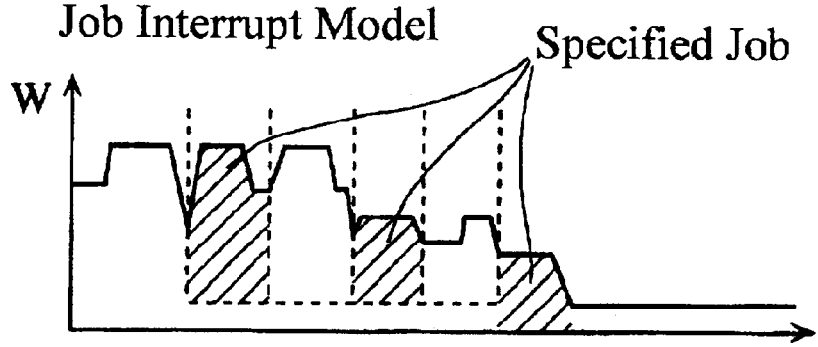
Figure 9D:
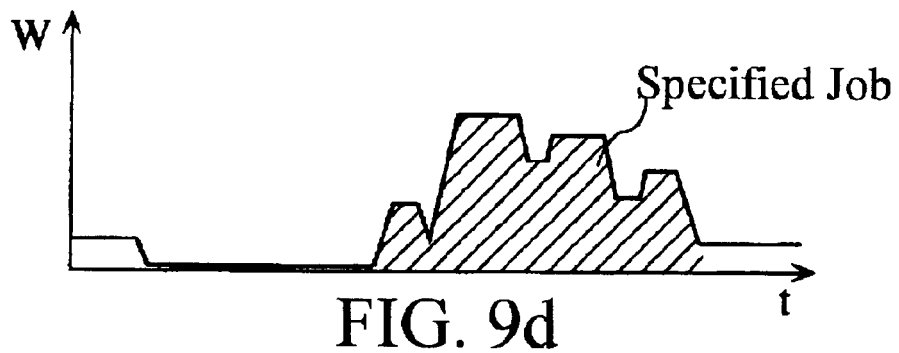

FIGS. 9a~9d show model cases for print jobs of specific numbers of pages for calculating power consumption in the printer, and the shaded areas indicate the amount of power required to execute a specified print job under present conditions. That is, FIG. 9a shows an example for processing a print job starting from the standby state, and FIG. 9b shows the power consumption when the job integration model is used. FIG. 9c shows a case for executing the job interrupt model, and FIG. 9d shows an example for executing a specified job when starting from the sleep state.

As can be understood from the drawing, the standby model consumes less power than the sleep model, but in both models much power is required to raise the temperature of the fixing heater. However, in the case of the job integration model shown in FIG. 9b, since the specified job is executed directly after execution of the previous job, power conservation is high because the residual heat of the fixing heater of the previous job can be used. In the case of the job interrupt model shown in FIG. 9c, since the specified job is allocated and executed during troughs of a prior job, the overall power conservation efficacy is greatest because the residual heat is used mutually.

In order to determine the power consumption in the specified job process in each model case, general calculations determine power consumption in accordance with the copy mode such as duplex copy, color copy, monochrome copy, and recording sheet size and the like, and are stored beforehand on the hard disk 1213; the CPU 1211 inserts into the calculation the latest status information and power consumption information (i.e., the rated power consumption, and power consumption when rising from a sleep/standby state) collected from each image processing device and determines the power consumption for the respective model cases. The estimate of power consumption for selecting a combination of devices for energy conservation, and the calculation from a relative comparison may be rough estimates.

A scanner can be moved to the sleep state by communicating only with the network control unit, and turning OFF the power source to the other parts, but since the scanner does not have a heater which consumes a large amount of power, little power is needed to move from the sleep state to the ready state.

Figure 8:
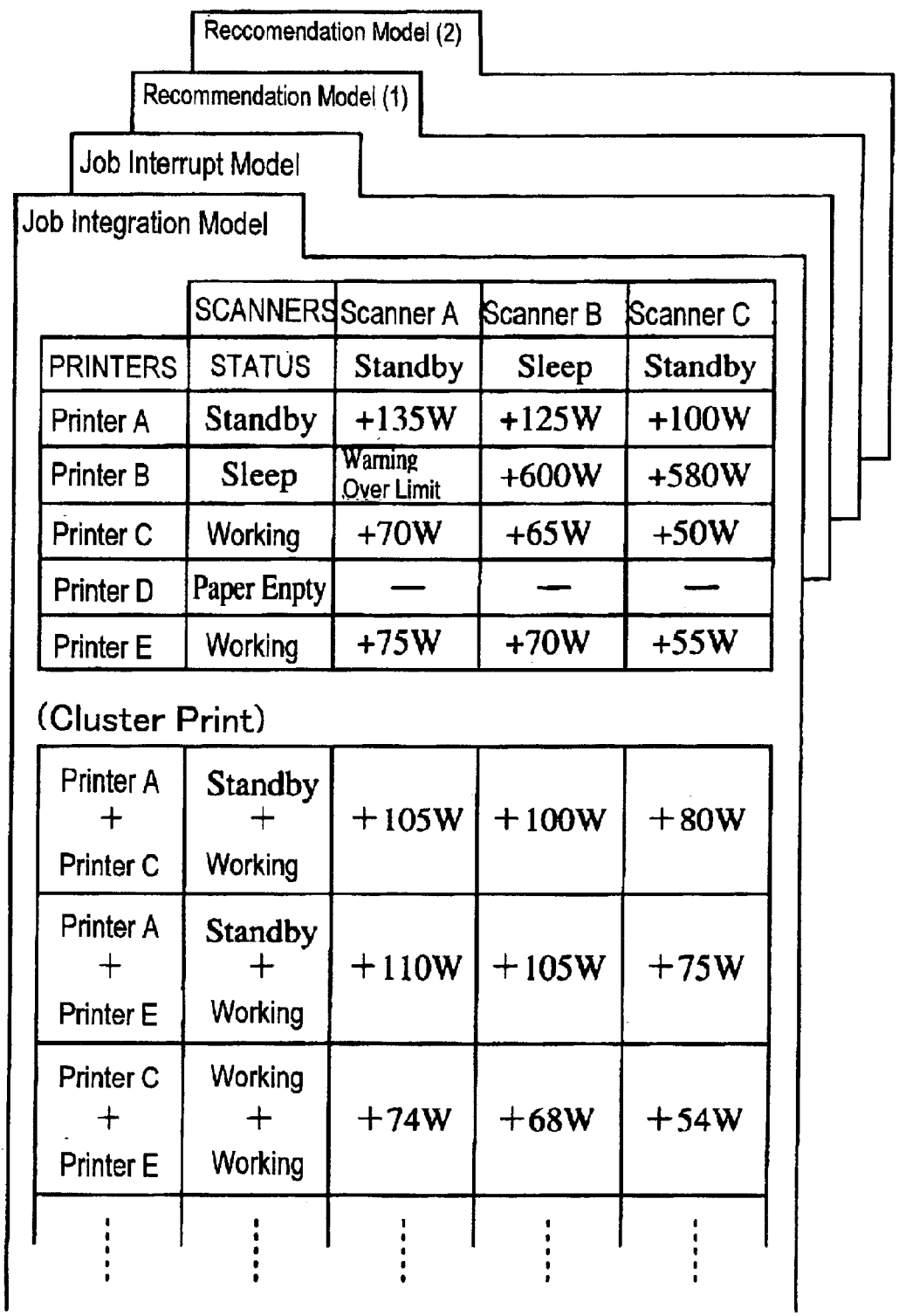
FIG. 8 shows an example of a comprehensive power consumption estimate table generated by determining an estimated value of power consumption for each combination of image processing devices.

The CPU 1211 determines the power consumption for each printer in the job integration model from the status information and power consumption information obtained from each image processing device, and generates the comprehensive power consumption estimation table of the job integration model shown in FIG. 8 based on the sum of the power consumption of the scanner combined with the printer.

Since it is impossible for printers which are not currently working to integrate the specified job in the job integration model, only printer C and printer E in FIG. 8 can be used to obtain an effective power conservation result by executing this model. Since the printer D which is in a paper empty state cannot perform job processing, comprehensive power consumption is not determined.

Furthermore, the printer B is a high-speed device, and when there is concern that the allowed power consumption capacity of the system may overrun when the printer B is started while other devices are working, a warning is displayed as shown in FIG. 8. Determination of this power capacity overrun may be obtained by the power capacity monitoring device 150 over the network, and need not be executed by the client A121.

Power consumption indicated by the [+] symbol before power consumption value is the power consumption required to execute a job by the device calculated from the collected device status. Furthermore, the amount of power consumption is shown as the power consumption. The amount of power consumption is the integration of power consumption in conjunction with time (shaded area in FIG. 9), and a numeric value obtained by dividing this amount of power consumption by the execution time of a specified job is shown as the power consumption. Since an accurate power consumption cannot be calculated when the page number information is unclear, the power consumption is managed by the previously described table. Accurate power consumption amount also can be roughly estimated when page number information is present.

For example, it can be understood from the table in FIG. 8 that when cluster printing is not specified by the cluster print specification key 207, the scanner C and printer C combination provide the best power consumption efficiency at the current moment. This combination is displayed on the energy conservation combination display 205 (FIG. 7) (step S7).

When a user sees this combination, accepts the combination and presses the start key 201, the CPU 1211 detects the action of the start key 201 and stores the combination in the RAM 1216 as a final determination (step S11). Then, a job number is appended to the job of this user, and this job number is displayed on a job number display 2081 of the specification information display 208, and information such as the job number, local device ID, and the device ID of the candidate destination device is transmitted to the selected device as operation specification information (steps S12, S13).

On the other hand, when the start key 201 is not pressed within a specified time period in step S10, the routine advances to step S14, and a determination is made as to whether or not there has been a mode change specification by the user. The mode change content is multi-branched. That is, paper size, magnification, number of parts, color or monochrome, duplex or single side, 2-in-1 or 4-in-1, normal print, job integration model or job interrupt model, desired job processing model, and whether or not the number of pages of the job set at 20 pages at initialization is actually the set number of pages are determined. When any of these key operations have been performed, a "mode change specification" is determined (step S14: YES), and the changed mode is reset and the routine returns to step S4, and data are updated when the time required for data update has elapsed (step S4: YES, step S5), and device combination of minimum power consumption is again determined and displayed based on the reset mode (steps S6, S7). Then, when the start key is turned ON by the user, steps S11~S13 are executed, and the remote copy job setting process ends. If there has been no mode change specification even after a specific time t3 has elapsed in step S14, it is determined that there is no mode change, and the routine advances directly to step S4.

(5) Scanning Process

Figure 5:
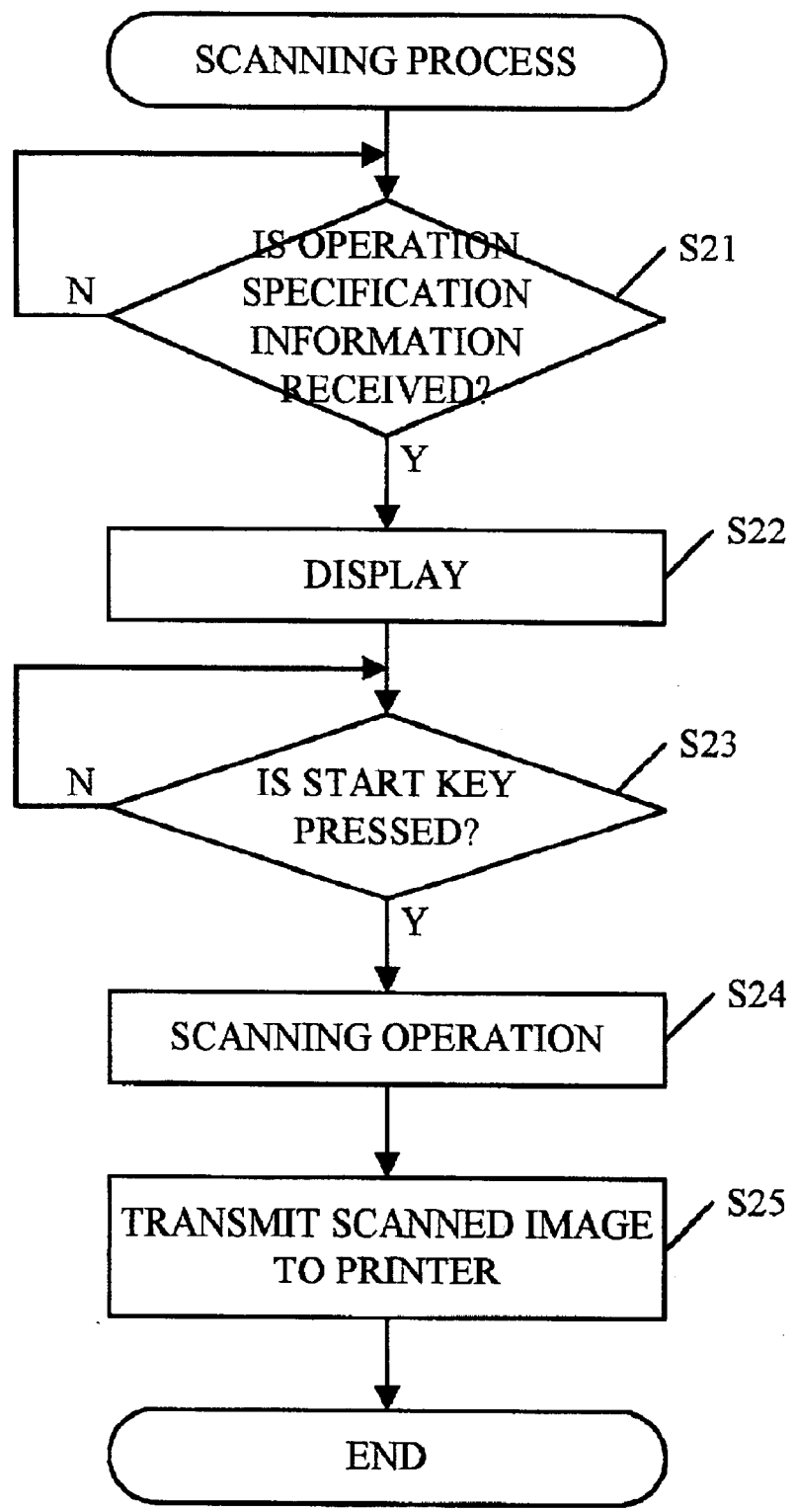
FIG. 5 is a flow chart showing the scanning process executed by a scanner selected by the management device.

FIG. 5 is a flow chart showing the process content in the scanner (e.g., scanner C) selected by the client A121.

When the CPU inside the scanner receives the operation specification information from the client A121 through the communication unit (step S21: YES), the job booking number is displayed on the operation panel.

The user who booked the remote copy job confirms that the job number of his job is displayed on the operation panel of the scanner, and when a document is set and the start key is turned ON (step S23: YES), the scanning operation is executed by the scanner (step S24). The device ID information of the pair of printers is included in the operation specification information received in step S21, the local device ID and the job number may be appended as header information on the image data obtained by the scanner, and transmitted to the printer operating cooperatively with the scanner (step S25).

(6) Printing Process

Figure 6:
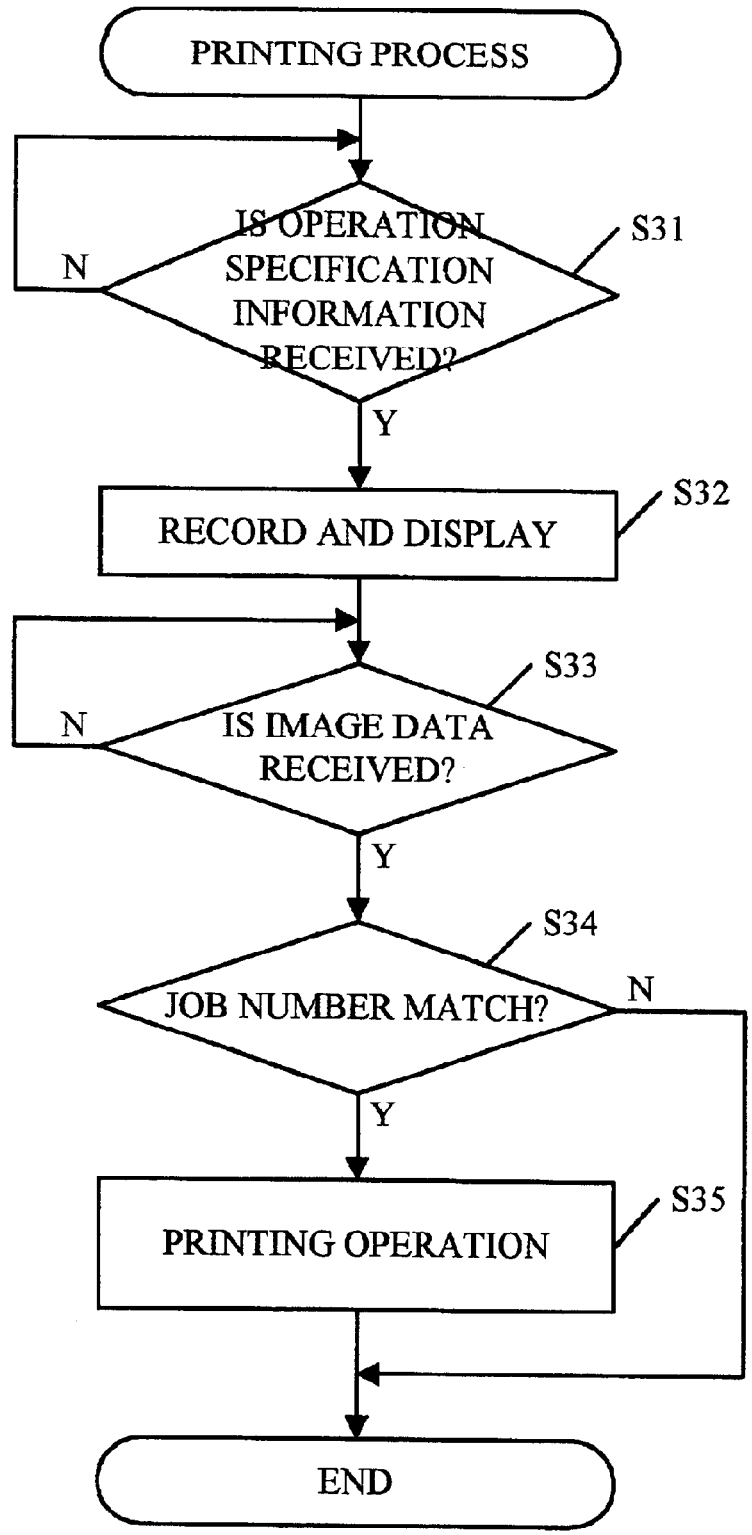
FIG. 6 is a flow chart showing the control content of the print process executed by a printer selected by the management device.

FIG. 6 is a flow chart showing the process content in a printer (e.g., printer C) selected by the client A121.

When the CPU 101 within the printer receives the operation specification information from the client A121 through the communication unit (step S31: YES), the IP address of the cooperating scanner and the job booking number are recorded in the internal RAM, and the job booking number is displayed on the operation panel 111 (step S32).

Then, when transmission data are received from the scanner of the cooperating destination (step S33: YES), the job number in the header information and the transmission side IP address are verified against the previously received operation specification information (step S34), and a printing operation to form an image on a paper sheet is executed based on the image data only when the aforesaid information matches (step S35).

Even in a construction wherein a printout is made simply based on received image data without executing steps S31, S32, S33, if the cooperative destination is well-defined by the scanner, a cooperative relationship is obtained pursuant to the determination of the client A121.

The program relating to the present invention may be recorded on various types of computer-readable recording media, e.g., magnetic tape, magnetic disk such as a floppy disk, DVD, CD-ROM, CD-R, MO, PD and the like, and the program may be mass produced and transferable in the form of the recording medium, and the program may be supplied by cable including the internet, various wireless networks, broadcast, transferred over electric communication lines and the like in the form of the program.

The program of the present invention as described above does not necessarily include all modules for executing the described processes by computer, e.g., general purpose programs installable on a special management device may be used, such as a communication program, graphic display program, or a program including an operating system (OS), and each process of the present invention may be executed by computer. Accordingly, it is unnecessary to record all modules on the recording media of the present invention, and it is unnecessary to transfer all modules.

Modifications

Although the present invention has been described by way of the embodiments, the content of the present invention is not limited to the specific examples described in the embodiments, and, for example, the modifications described below may be considered.

(1) The above embodiments have been described in terms of a scanner and a printer operating cooperatively to execute a remote copy job, however, the mode of processing a print job cooperatively by a plurality of image processing devices applies to cluster printing for processing a single print job by a plurality of printers. In this case, selection of a scanner is unnecessary, and print image data may be included in the operation specification information in step S13 of FIG. 4. Furthermore, the present invention is even applicable to allotting and scanning a large document by a plurality of scanners.

(2) The above embodiments have been described using a printer and scanner (including a copier) as image processing devices to be managed, however, the present invention is also applicable to other image processing devices such as, for example, facsimile machines and the like.

(3) A client computer has been used as the management device in the above examples, however, a server also may have the management function. Furthermore, the management function may be in the image processing device itself. In the latter case, a combination of a device producing the best power conservation efficiency in cooperation with the local device is selected. For example, when the management device is loaded in a scanner, the management device can determine which printer executing the image data obtained by the scanner can result in the least power consumption overall. When the management device is loaded in a printer, a cooperative scanner or printer may be selected.

(4) In the above embodiments, the power consumption information uses information transmitted from each device over a network, however, this information also may be recorded by manual input by a user or device manager. Furthermore, information relating to power consumption also may be obtained from the power capacity monitoring device 150 over the network.

(5) In the above embodiments, a comprehensive power consumption estimation table corresponding to conditions such as copy mode and the like is generated, and a single combination of image processing devices having the least power consumption is selected and displayed via this table, however, a plurality of candidates of relatively slight power consumption (e.g., the best three combinations) may be displayed, and a user may select from among these candidates.

Furthermore, when a job is always executed by a combination of image processing devices having the least power consumption set by the management device without allowing the possibility of user selection, it is unnecessary to always display the combinations.

(6) In the above embodiments, the description has been premised on all image processing devices (particularly printers) executing a remote copy mode set on a remote copy mode setting screen of the client A121, however, there may be cases wherein devices incapable of duplex printing, and devices capable of only monochrome printing are connected to the network. In such cases, for example, information relating to executable modes may be collected in addition to status information, and only combinations capable of executing the set job process mode are selected as candidates based on this information, so as to determine the combination of least power consumption among the candidates.

(7) In the above embodiments, only an example of a combination having the least power consumption is displayed, however, examples of a plurality of combinations in least power consumption sequence may be sorted and displayed, examples of a plurality of combinations may be displayed in list format or table format, and examples of combinations having the least power consumption may be highlighted in display (e.g., changing the display format such as the color or text of the best combination to be different from other combinations).

According to the above embodiments, in a management device connected to a plurality of image processing devices over a network, comprehensive power consumption information is acquired for each combination of image processing devices cooperatively processing a job among a plurality of image processing devices, and one combination or a plurality of combinations having the least comprehensive power consumption is selected and displayed among the combinations of image processing devices based on the acquired information. As a result, if such a combination of image processing devices is required to execute a job, two or more image processing devices cooperatively process the job with the least power consumption possible.

According to the above embodiments, in a management device connected to a plurality of image processing devices over a network, comprehensive power consumption information is acquired for each combination of image processing devices cooperatively processing a job among a plurality of image processing devices, and the combination having the least comprehensive power consumption is set as the job request destination. As a result, since the combination of image processing devices having the least power consumption is automatically required to execute the job, two or more image processing devices cooperatively process the job, providing optimum power conservation efficiency.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A management apparatus connected to a plurality of image processing apparatuses over a network, said management apparatus comprising:

power consumption acquiring means for acquiring comprehensive power consumption information for each combination of image processing apparatuses cooperatively processing a job among the plurality of image processing apparatuses;

selection means for selecting a combination having the least comprehensive power consumption among the combinations of the image processing apparatuses; and display means for displaying the selected combination.

2. The management apparatus as claimed in claim 1, further comprising information acquiring means for acquiring information of an operating state of each image processing apparatus and a power consumption information inherent to each apparatus, wherein said power consumption acquiring means determines the comprehensive power consumption based on the information of the operating state of each image processing apparatus and the inherent power consumption information.

3. The management apparatus as claimed in claim 1, further comprising candidate selection means for selecting a candidate combination of image processing apparatuses for cooperatively processing a job, wherein said power consumption acquiring means acquires comprehensive power consumption information of the candidate combination.

4. The management apparatus as claimed in claim 1, further comprising receiving means for receiving job processing condition input, said power consumption acquiring means acquires comprehensive power consumption information when a job is processed in accordance with the received job processing conditions.

5. An image processing apparatus connected to other image processing apparatus over a network, wherein said image processing apparatus executes a job cooperatively with one other or a plurality of other image processing apparatus, and includes said management apparatus as claimed in claim 1.

6. The image processing apparatus as claimed in claim 5, wherein a local image processing apparatus itself is included in the combination of image processing apparatuses selected by said selection means of the management apparatus.

7. A management apparatus connected to a plurality of image processing apparatuses over a network, said management apparatus comprising:

power consumption acquiring means for acquiring comprehensive power consumption information for each combination of image processing apparatuses cooperatively processing a job among the plurality of image processing apparatuses;

selection means for selecting a combination having the least comprehensive power consumption among the combinations of the image processing apparatuses; and job request destination setting means for setting a combination of selected image processing apparatuses as the job request destination.

8. The management apparatus as claimed in claim 7, further comprising information acquiring means for acquiring information of an operating state of each image processing apparatus and a power consumption information inherent to each apparatus, wherein said power consumption acquiring means determines the comprehensive power consumption based on the information of the operating state of each image processing apparatus and the inherent power consumption information.

9. The management apparatus as claimed in claim 7, further comprising candidate selection means for selecting a candidate combination of image processing apparatuses for cooperatively processing a job, wherein said power consumption acquiring means acquires comprehensive power consumption information of the candidate combination.

10. The management apparatus as claimed in claim 7, further comprising receiving means for receiving job processing condition input, said power consumption acquiring means acquires comprehensive power consumption information when a job is processed in accordance with the received job processing conditions.

11. An image processing apparatus connected to other image processing apparatus over a network, wherein said image processing apparatus executes a job cooperatively with one other or a plurality of other image processing apparatus, and includes said management apparatus as claimed in claim 7.

12. The image processing apparatus as claimed in claim 11, wherein a local image processing apparatus itself is included in the combination of image processing apparatuses selected by the selection means of the management apparatus.

13. A management method in a management apparatus connected to a plurality of image processing apparatuses over a network, said management method comprising the steps of:

acquiring comprehensive power consumption information for each combination of image processing apparatuses cooperatively processing a job among the plurality of image processing apparatuses;

selecting a combination having the least comprehensive power consumption among the combinations of the image processing apparatuses; and displaying the selected.

14. A management method in a management apparatus connected to a plurality of image processing apparatuses over a network, said management method comprising the steps of:

acquiring comprehensive power consumption information for each combination of image processing apparatuses cooperatively processing a job among the plurality of image processing apparatuses;

selecting a combination having the least comprehensive power consumption among the combinations of the image processing apparatuses; and setting a combination of selected image processing apparatuses as the job request destination.

15. A computer program product comprising:

a computer-readable medium; and computer program contained on said computer-readable medium, and executed in a management apparatus which is connected to a plurality of image processing apparatuses over a network, and which includes display means, said computer program making a computer function as:

power consumption acquiring means for acquiring comprehensive power consumption information for each combination of image processing apparatuses cooperatively processing a job among the plurality of image processing apparatuses;

selection means for selecting a combination having the least comprehensive power consumption among the combinations of the image processing apparatuses; and display means for displaying the selected combination.

16. A computer program product comprising:

a computer-readable medium; and computer program contained on said computer-readable medium, and executed in a management apparatus which is connected to a plurality of image processing apparatuses over a network, and which includes display means, said computer program making a computer function as:

power consumption acquiring means for acquiring comprehensive power consumption information for each combination of image processing apparatuses cooperatively processing a job among the plurality of image processing apparatuses;

selection means for selecting a combination having the least comprehensive power consumption among the combinations of the image processing apparatuses; and job request destination setting means for setting a combination of selected image processing apparatuses as the job request destination.

* * * * *